United States Patent [19]

Gautier et al.

[11] Patent Number: 5,664,475
[45] Date of Patent: Sep. 9, 1997

[54] PNEUMATIC SERVO WITH SILENT OPERATION

[75] Inventors: Jean Pierre Gautier; Ulysse Verbo, both of Aulnay-Sous-Bois; Miguel Perez Revilla, Argenteuil; Bernard Tripier, Chatou, all of France

[73] Assignee: AlliedSignal Europe Services Techniques, Drancy, France

[21] Appl. No.: 338,606
[22] PCT Filed: Oct. 13, 1994
[86] PCT No.: PCT/FR94/01186
  § 371 Date: Nov. 21, 1994
  § 102(e) Date: Nov. 21, 1994
[87] PCT Pub. No.: WO95/13947
  PCT Pub. Date: May 26, 1995

[30] Foreign Application Priority Data

Nov. 16, 1993 [FR] France ............................... 93 13614

[51] Int. Cl.⁶ ........................................................ F15B 9/10
[52] U.S. Cl. ........................................... 91/369.1; 91/376 R
[58] Field of Search ............................... 91/369.1, 369.2, 91/369.3, 376 R

[56] References Cited

U.S. PATENT DOCUMENTS

| | | | |
|---|---|---|---|
| 4,368,661 | 1/1983 | Ohmi et al. | 91/376 R |
| 4,450,688 | 5/1984 | Boehm | 91/369.2 X |
| 4,667,568 | 5/1987 | Morimoto | 91/376 R |
| 5,031,507 | 7/1991 | Bornemann et al. | 91/376 R X |
| 5,161,454 | 11/1992 | Frasier | 91/376 R |
| 5,249,505 | 10/1993 | Hewitt | 91/376 R |

FOREIGN PATENT DOCUMENTS 0405603  6/1990  European Pat. Off. .
2051270  1/1981  United Kingdom .

*Primary Examiner*—Hoang Nguyen
*Attorney, Agent, or Firm*—Leo H. McCormick, Jr.

[57] ABSTRACT

A pneumatic servo for assisting braking. The servo has a casing with an axis of symmetry which is divided in leak-tight fashion by a movable wall structure into a front chamber and a rear chamber. The front chamber is permanently connected to a source of partial vacuum while the rear chamber is connected selectively to the front chamber and to air in the surrounding environment by a three-way valve. A sleeve divided an annular bore located in a projection that extends through the movable wall through the casing into a static volume and a concentric annular volume. The sleeve engages the projection to position the three-way valve in the bore. A return spring located in the static volume engages the control rod while an end plug engages the sleeve to seal the static volume from the surrounding environment. The annular volume being is respectively connected by first and second openings to the surrounding environment and bore. In response to an input from the control rod, air flows from the environment past the three-way valve to the rear chamber. Fins located in the annular volume engage air in the annular volume creating a circular flow path for the air on moving from the first opening toward the second opening so as to reduce any abrupt change in direction of the moving air on being presented to the three-way valve that may create noise.

6 Claims, 2 Drawing Sheets

PNEUMATIC SERVO WITH SILENT OPERATION

The present invention relates to pneumatic servos of the type which are used to provide assistance with braking of motor vehicles.

BACKGROUND OF THE INVENTION

Such servos conventionally include a casing having an axis of symmetry, divided in leaktight fashion by a movable wall structure into a front chamber permanently connected to a source of partial vacuum, and a rear chamber connected selectively to the front chamber or to the outside atmosphere by a three-way valve actuated by an axial control rod subjected to the action of a return spring located in an annular space between the control rod and a rear tubular part of the movable wall structure, projecting out of the casing, the three-way valve being located in this rear tubular part.

These servos are usually located in the engine compartment of the vehicle, on its bulkhead, so that the rod for controlling the servo projects into the passenger compartment so that it can be actuated by the driver. It follows that the rear central part of the movable wall, including the three-way valve, also projects into the passenger compartment.

As a result, when the driver actuates the brake pedal connected to the control rod of the servo, the latter sucks air at atmospheric pressure in from the passenger compartment of the vehicle. The air set in motion by the operation of the servo therefore generates noises which are wholly transmitted into the passenger compartment of the vehicle.

Attempts have been made to provide various solutions to this problem. For example, document FR-A-2,551,009 provides means for guiding the air in the immediate surroundings of the three-way valve, upstream and downstream of the latter.

Document FR-A-2,516,880 provides a silencer device made from crosslinked foam, located inside the rear central part of the movable wall structure, this device including an outer surface applied against the inner surface of this rear central part, and the inside of which is formed with uninterrupted passage openings pointing in the direction of the control rod to give a passage for the flow of air through the device.

Document DE-A-3,924,672 for its part provides a servo in which the intake for air at atmospheric pressure is situated in the engine compartment of the vehicle.

SUMMARY OF THE DRAWINGS

However, these prior solutions still present devices which are imperfect, or economically inapplicable because they are too complicated. What is more, for the purpose of reducing the operating noise, these systems introduce into the path of the air, obstacles to its movement which increase the response time of the servo at the beginning of its actuation phase.

Then again, studies conducted by the Applicant have shown that the noise generated by the operation of a servo has two main sources. The first lies in the three-way valve itself, which offers the air only a small passage cross-section. The second lies in the spring for returning the control rod, which spring presents an obstacle to the passage of the air.

The prior documents tried to minimize the first source of noise, with the drawbacks mentioned above, and neglected the second source of noise, or did not know how or were not able to solve the problem posed by this second source of noise.

The object of the present invention is therefore to propose a servo the operation of which is totally silent, implementing means which are simple, reliable and inexpensive, and which do not influence the response time of the servo.

To this end, the invention proposes a servo of the type recalled above, in which means are provided for dividing the annular space into a housing for the return spring and an annular volume for the circulation of moving air upstream of the three-way valve.

Other objects, characteristics and advantages of the present invention will emerge more clearly from the description which follows of one embodiment given by way of illustration with reference to the appended drawings.

BRIEF DESCRIPTION OF THE DRAWINGS

Figure 1:
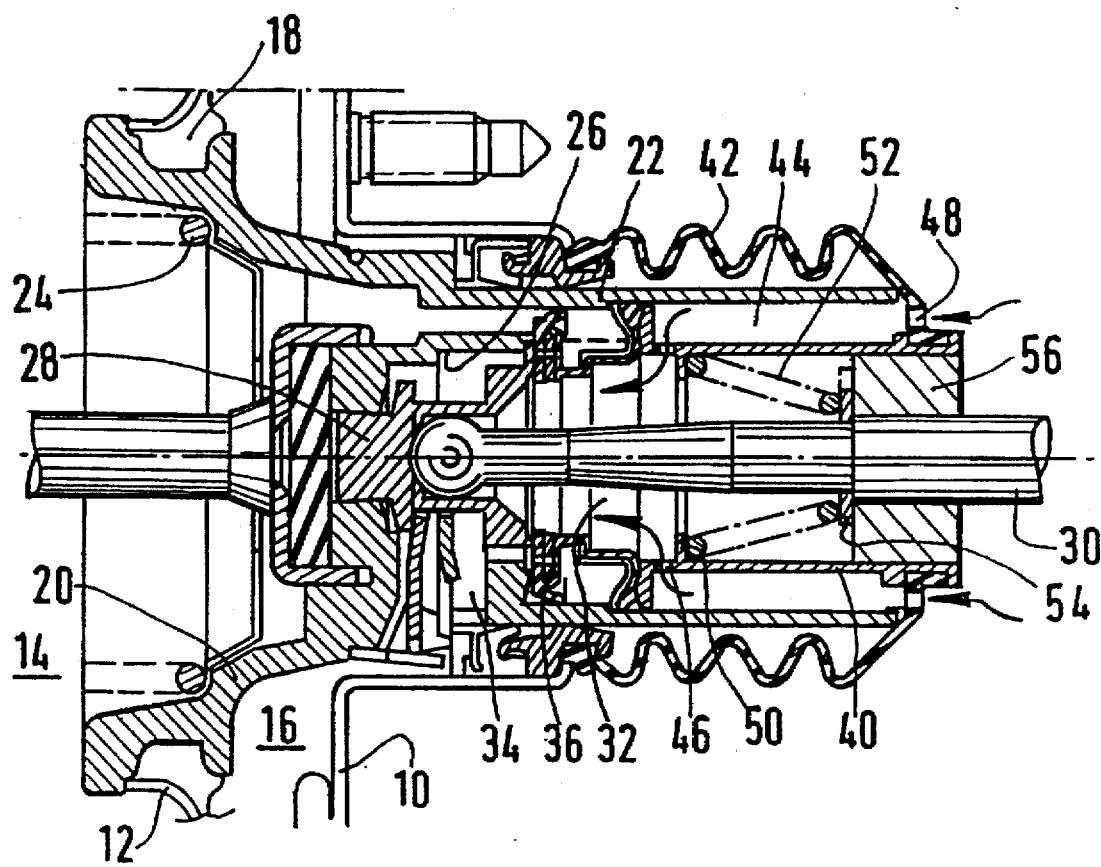
Figure 2:
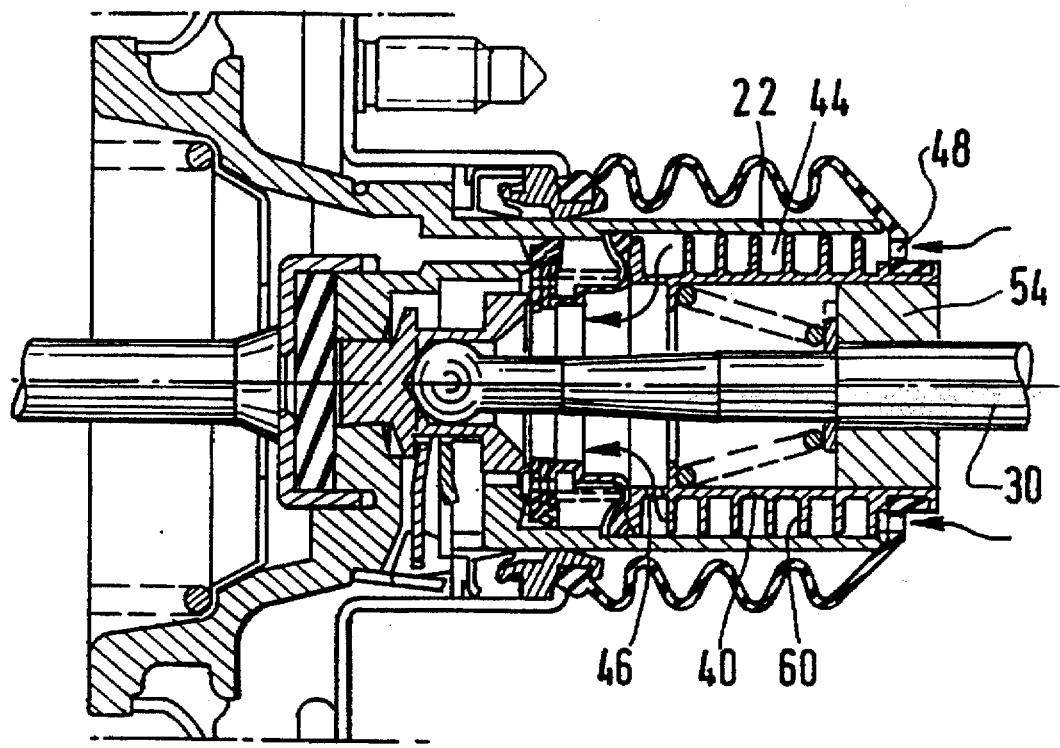
Figure 3:
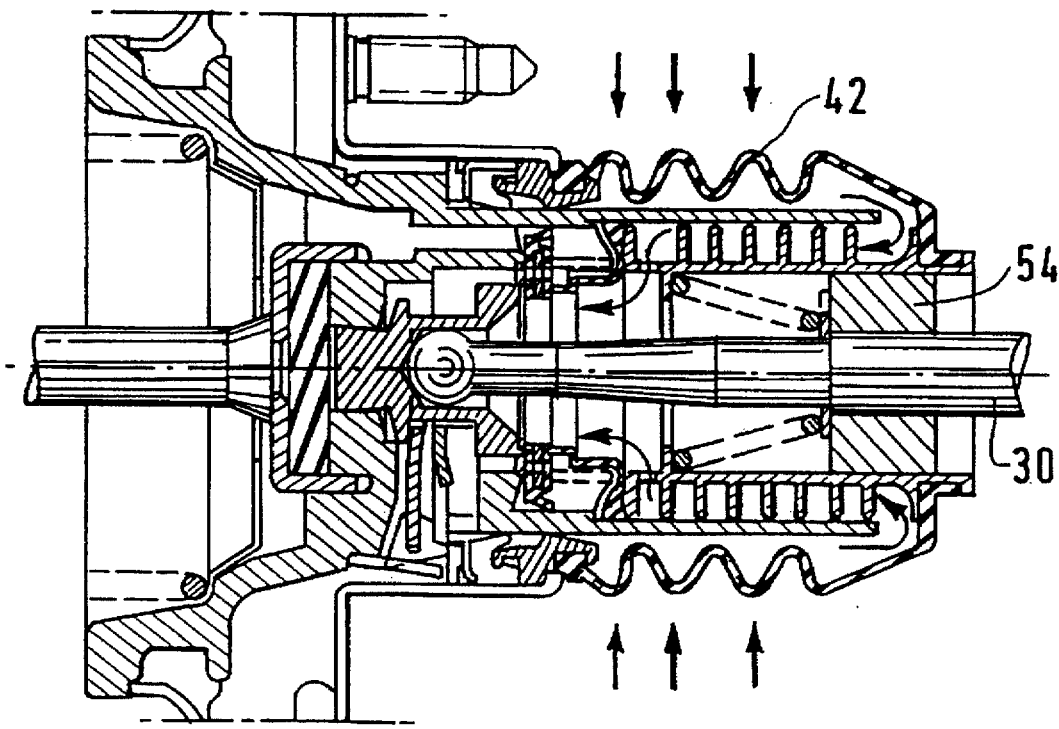

FIG. 1 is a side view, in longitudinal section, representing the rear central part of a pneumatic servo for assisting with braking, produced in accordance with the present invention, FIG. 2 is a view similar to that of FIG. 1, of a first embodiment variant, and FIG. 3 is a view similar to that of FIG. 1 of a second embodiment variant.

DETAILED DESCRIPTION OF THE INVENTION

The figures represent the rear central part of a pneumatic servo for assisting with braking in order to be placed in the usual way between the brake pedal of a vehicle and the master cylinder controlling the hydraulic braking circuit of this vehicle. By convention, that part of the servo which points towards the master cylinder is termed the "front", and that part of the servo which points towards the brake pedal is termed the "rear". In the figures, the front is thus to the left and the rear to the right.

The servo represented comprises an outer casing 10 in the form of a shell, exhibiting a symmetry of revolution about an axis X—X'. Only the rear central part of this casing 10 is represented in the figures.

A movable wall structure 12 delimits a front chamber 14 and a rear chamber 16 inside the casing 10. The movable wall 12 is associated with a flexible unrolling membrane made of elastomer the internal peripheral edge of which is received in a leaktight fashion by virtue of a bead 18 in a hollow boost piston 20 located along the axis X—X' of the servo, and the external peripheral edge (not represented) of which is fixed in leaktight fashion to the external casing 10.

The hollow piston 20 extends to the rear in the form of a tubular part 22 which passes in leaktight fashion to the rear wall of the casing 10. A compression spring 24 interposed between the piston 20 and the front wall (not represented) of the casing 10 normally holds the piston 20 in the rear rest position illustrated in the figures, in which position the rear chamber 16 has its minimum volume and the front chamber 14 has its maximum volume.

In the central part of the movable wall situated in front of the rear tubular part 22, the piston 20 exhibits a bore 26 in which is slidingly received a plunger 28 which also exhibits a symmetry of revolution about the axis X—X'. The front end of a rod 30 controlling the servo, which rod is also located along the axis X—X', is mounted so that it can swivel in a blind bore of the plunger 28.

The rear end (not represented) of the control rod 30, which projects outside the tubular part 22, is controlled directly by the brake pedal (not represented) of the vehicle.

The annular space 32 delimited between the control rod 30 and the tubular part 22 of the piston 20 can communicate with the rear chamber 16 through a radial passage 34 formed in the central part of the piston when assistance means, controlled by the plunger 28, are actuated.

As is conventional, these assistance means comprise a three-way valve including an annular shutter 36 and two annular valve seats formed to the rear of the central part of the piston 20 and to the rear of the plunger 28.

When the control rod 30 is in the rear rest position, the shutter 36 normally establishes a communication between the two chambers 14 and 16 of the servo.

When the driver of the vehicle actuates the brake pedal, this results in a forwards movement of the control rod 30, of the plunger 28 and of the shutter 36 which, in a first instance, isolates the chambers 14 and 16 from one another and then, in a second instance, opens the communication between the rear chamber 16 and the annular space 32.

In a conventional design of servo, the annular space 32 communicates with the outside atmosphere axially, that is to say around the control rod 30. The air is thus sucked into the rear chamber 16 through the valve passage between the shutter 36 and the valve seat formed on the plunger 28, and by passing between the turns of the spring for returning the control rod 30.

In such a design, the gap consisting of the valve passage constitutes a source of noise, as does the passage cross-section between the turns of the return spring. Conventionally, a filter is located between the control rod and the rear end of the tubular part 22 to fulfil the functions both of an air filter and of a noise attenuator. In this latter function, the filter offers a significant resistance to the passage of the air, and therefore is an impediment to the operation of the servo, which worsens the response time of the latter.

In accordance with the present invention, this drawback is avoided by providing, in the annular space 32, a division between the moving air upstream of the three-way valve, and the spring for returning the control rod.

As is seen in FIG. 1, these division means consist of a cylindrical sleeve 40 located in the rear tubular part 22 and secured to the latter. The sleeve 40 for example bears via its front end on the rear end of the fixture for fixing the shutter 36 on the rear tubular part 22, and its rear end is, for example, secured to a flexible tubular gaiter 42 protecting the sliding of the tubular part 22 in the casing 10, the gaiter 42 being, on the other hand, fixed in a leaktight fashion to the casing 10 via its front end.

The sleeve 40 has an external diameter distinctly less than the internal diameter of the tubular part 22 so as to define an annular volume 44 between these elements. Openings 46 are made in the front end of the sleeve 40, to make the space 32 and the volume 44 communicate. Likewise, openings 48 are made in the rear end of the sleeve 40, or, as represented, in the rear end of the gaiter 42, to make the volume 44 communicate with the external atmosphere.

The sleeve 40 is additionally formed on its internal surface with an internal radial shoulder 50, formed to the rear of the openings 46, to act as a support for a compression spring 52 which is also supported on the shoulder 54 of the control rod 30, and acts as a spring for returning the control rod. A plug 56 provides sealing between the control rod 30 and the sleeve 40. The sleeve 40 thus forms a division of the annular space 32 into an annular volume 44, communicating at the rear with the external atmosphere through the openings 48, and at the front with the shutter 36 via the openings 46, and a housing for the spring 52 for returning the push rod 30, the housing consisting of the shoulders 50 and 54.

It is therefore understood that when the control rod 30 is actuated, the air at atmospheric pressure can arrive in the rear chamber 16 of the servo by passing through openings 48, the annular volume 44, the openings 46 and the annular space 32, following the arrows represented in FIG. 1. The moving air thus circumvents the return spring 52, which eliminates the source of noise which the spring constituted, the air situated around the spring 52 being static by virtue of the plug 56.

In a particularly advantageous manner, by virtue of the invention, the sleeve 40 not only allows elimination of one of the sources of operating noise of the servo, constituted by the spring for returning the control rod, but it also makes it possible to attenuate, to a large extent, the other source of noise constituted by the three-way valve.

Indeed, as represented in FIG. 2, the invention makes it possible to install a silencer device in the annular volume 44. As can be seen in FIG. 2, the sleeve 40 is equipped on its external surface with fins 60 which are intended to extend the path of the air between the openings 48 and 46. Preferably fins 60 are formed of a single piece, for example by moulding, with the sleeve 40.

The external diameter of the fins 60 is equal to the internal diameter of the tubular part 22 for forming the air guidance ducts. The fins 60 may be formed on the sleeve 40 so that they exhibit baffles against the passage of air in the volume 44.

According to a preferred embodiment, a single fin 60 is located in the annular volume 44, and has a helicoid configuration so that the air takes a circular helical path between the openings 48 and 46.

In this way, the operating noise generated by the three-way valve is attenuated by the length of the path imposed in the volume 44 by the fin or fins 60, and is no longer transmitted through the openings 48 into the passenger compartment of the vehicle.

Of course, the fins 60 are located such that they extend the path of the air without impeding its movement, so as not to reduce the response time of the servo. In the case of one, circular helical fin 60, it will be possible to choose its pitch so that it exhibits the least drop in pressure head. It will also be possible to use two or more circular helical fins so as to choose both the pitch, that is to say the width, and the inclination to the axis of the air passages thus formed, with the purpose of offering minimal resistance to the air.

As a variant, it will be possible to use a cylindrical sleeve like the one in FIG. 1, and to produce one or more fins on the internal surface of the tubular part 22. Likewise, in the servo of FIG. 1, it will be possible to insert a tubular component including baffles or a circular helix like the fins 60 between the tubular part 22 and the sleeve 40.

In the embodiment of FIGS. 1 and 2, it will be possible to add, for example at the openings 48, a dust-trap filter which has only a negligible influence on the flow of air through it, and which therefore does not disturb the response time of the servo.

An important advantage offered by a helical fin 60 is that it gives the air passing through the volume 44 a tangential velocity component about the axis X—X', so that the air conserves a helical motion on approaching the valve passage between the shutter 36 and the valve seat formed on the plunger 28. It follows that this valve passage imposes no abrupt change in direction on the moving air, so that the air can negotiate this valve passage more easily. The rear chamber of the servo can consequently fill more quickly, and with less noise.

FIG. 3 represents another embodiment variant, in which the openings 48 have been omitted. According to this variant, the gaiter 42 is made from a porous and deformable material, such as a porous elastomeric material for example, or any fibrous or woven material, possibly reinforced with rigid hoops to prevent the gaiter from hindering the sliding of the tubular part 22 in the casing 10.

The gaiter 42 has a significant surface area subjected to the outside atmosphere, and thus presents practically no obstacle to the air passing through it when the servo is operating. This gaiter 42 also has the advantage of simultaneously fulfilling the dust-trap filter function.

In the embodiments of FIGS. 2 and 3, the plug 54 [sic] will advantageously be produced from a material which is airtight but has a certain elasticity, such as a porous material with closed cells for example, so as to allow a slight angular excursion of the control rod 30 about the swivelling connection with the plunger 28.

Of course, the invention is not limited to the embodiments which have been described, but can, in contrast, receive numerous modifications which will be obvious to a person skilled in the art. Thus, for example, in the embodiment of FIG. 1, it will be possible to arrange a fibrous nonwoven material in the annular volume 44 for absorbing the noise generated by the three-way valve, without impeding the movement of air in this volume 44 too much. It will also be possible, as represented in dotted lines in the upper half of FIG. 1, to equip the sleeve 40 with a forwards tubular extension secured to the sleeve upstream of the openings 46 for providing additional guidance for the air leaving these openings up to the vicinity of the three-way valve.

We claim:

1. A pneumatic servo for assisting braking, said servo having a casing with an axis of symmetry which is divided in leaktight fashion by a movable wall structure into a front chamber and a rear chamber, said front chamber being permanently connected to a source of partial vacuum, said rear chamber being connected selectively to the front chamber and to air in the surrounding environment by a three-way valve actuated by a control rod, said control rod being subjected to the action of a return spring located in an annular space between the control rod and a tubular part of the movable wall structure which projects out of the casing, said three-way valve being located in a bore in said rear tubular part, characterized in that sleeve means are provided for dividing said annular space into a static volume and a concentric annular volume, said static volume being defined by an end plug which engages said sleeve means and said control rod, said return spring being located in said static volume, said annular volume being connected to said surrounding environment through a first opening and to said bore through a second opening in said sleeve, said three-way valve on being actuated allowing air from the surrounding environment to flow in said annular volume in a circular flow path from said first opening toward said second opening, said circular flow path attenuating an abrupt change in the direction of the air flow on being presented to said three-way valve.

2. The pneumatic servo as recited in claim 1 characterized in that said circular flow path is created by the engagement of said air with at least one fin located in said annular volume.

3. The pneumatic servo as recited in claim 1 characterized in that said circular flow path is caused by the engagement of said air with several fins located in said annular volume.

4. The pneumatic servo as recited in claim 1 characterized in that said circular flow path is caused by the engagement of said air with a fin located in said annular volume, said fin having a helicoid configuration to increase the length of the circular flow path and resulting flow path for noise generated through he operation of said three-way valve.

5. The pneumatic servo as recited in claim 3 characterized in that said several fins are selected to define a pitch and inclination for an axis of said flow path to reduce the resistance of the flow of said moving air.

6. The pneumatic servo as recited in claim 1 further including a flexible tubular gaiter having a first end fixed to said sleeve and a second end fixed to said casing, said gaiter being made of a porous and deformable material through which air from the surrounding environment is presented to said annular volume.

* * * * *